United States Patent [19]
Mayer et al.

[11] Patent Number: 6,002,596
[45] Date of Patent: Dec. 14, 1999

[54] MODULAR POWER SUPPLY HAVING AN INPUT AND OUTPUT MODULE AND METHOD OF OPERATION THEREOF

[75] Inventors: Raymond G. Mayer, Plano; James C. Wadlington, Dallas, both of Tex.

[73] Assignee: Lucent Technologies Inc., Murray Hill, N.J.

[21] Appl. No.: 09/169,647

[22] Filed: Oct. 9, 1998

[51] Int. Cl.[6] ............................ H02M 3/335; H02M 3/24
[52] U.S. Cl. ................................................. 363/21; 363/97
[58] Field of Search ................................... 363/21, 97, 40, 363/41, 132, 71; 307/66, 48

[56] References Cited

U.S. PATENT DOCUMENTS 4,719,550  1/1988  Powell et al. .............................. 363/37

Primary Examiner—Peter S. Wong
Assistant Examiner—Rajnikant B. Patel

[57] ABSTRACT

A modular power supply and a method of operating the same to accept either AC or DC input power. In one embodiment, the modular power supply includes an input module that accepts input power and employs at least one main power switch and a step-up transformer to provide intermediate power at an enhanced voltage at an output thereof. The modular power supply also includes a power transfer conductor coupled to the output. The modular power supply further includes an output module, having an input coupled to the conductor, that accepts the intermediate power and employs a step-down transformer and an output rectifier to provide DC output power at a voltage that is less than the enhanced voltage. The modular power supply still further includes a diode, coupled to the input and output modules, that prevents the step-up and step-down transformers from saturating.

20 Claims, 2 Drawing Sheets

MODULAR POWER SUPPLY HAVING AN INPUT AND OUTPUT MODULE AND METHOD OF OPERATION THEREOF

TECHNICAL FIELD OF THE INVENTION

The present invention is directed, in general, to power conversion and, more specifically, to a modular power supply having an input and output module and a method of operation thereof.

BACKGROUND OF THE INVENTION

Power supplies are used in many areas of industry to provide necessary electrical energy. Many of these power supplies take AC power from the power distribution grid and convert it into the specific voltages that are needed to operate specific equipment. The converted voltages are typically DC voltages needed to power computer systems, telecommunications or other electronic equipment. Many of the power supply systems used for larger computer or telecommunications environments require very high power density units, whereby the output power is provided by a very small packaged power supply. Many of these power supply systems employ switching devices in the power train and operate in a switching mode to achieve higher efficiencies and higher power densities.

In many cases, the physical packaging requirements of switching-mode power supplies (SMPS) are in direct conflict with an optimal circuit layout for the chosen topology. Several printed wiring boards are typically needed to mount all of the necessary power train and control circuits. The power train itself may need to be split into two or more sections, where each section may be located on a different printed wiring board. This presents many mechanical and electrical design challenges. Passing large, high frequency switching currents between these printed wiring boards can be particularly difficult, especially in DC to DC applications with lower input voltages.

In conjunction therewith, the circuit and packaging design should take into account the wiring and connector current ratings. The switching currents, in conjunction with a potentially large wiring loop area afforded by the interconnecting wiring, may generate large magnetic fields. These magnetic fields may couple with and disturb the control circuitry of the SMPS. Additionally, if these fields are not adequately contained, the unit may fail to meet radiated emission requirements. Also, the leakage inductance of the wiring loops could store sufficient inductive energy to cause excessive dissipation in the components of the power supply that may result in malfunction or even failure of the components, such as snubber networks or semiconductor components, therein.

Additionally, the mechanical interface is often predefined and a conversion from an AC powered unit to a DC powered unit or an input voltage range modification must be accommodated using as much of the existing environment and equipment as possible to contain costs. Under the constraint of maintaining or even increasing output power, increasing the magnitude of an input voltage may cause some of the component voltage ratings to be exceeded or their design margins to be reduced to an unacceptable level. Conversely, reducing the magnitude of the input voltage will typically cause the power supply currents to increase for constant output power. This may cause operating and redesign problems that are even more severe depending on the magnitude of the current increases. The increased switching currents and the fact that the current carrying capacity of the interconnects may be limited due to mechanical and packaging constraints provide design challenges that should be addressed.

Accordingly, what is needed in the art is a power supply that account for more stringent requirements such as higher switching currents and frequencies therein.

SUMMARY OF THE INVENTION

To address the above-discussed deficiencies of the prior art, the present invention provides a modular power supply and a method of operating the same to accept either AC or DC input power. In one embodiment, the modular power supply includes an input module that accepts input power and employs at least one main power switch and a step-up transformer to provide intermediate power at an enhanced voltage at an output thereof. The modular power supply also includes a power transfer conductor coupled to the output. The modular power supply further includes an output module, having an input coupled to the conductor, that accepts the intermediate power and employs a step-down transformer and an output rectifier to provide DC output power at a voltage that is less than the enhanced voltage. The modular power supply still further includes a diode, coupled to the input and output modules, that prevents the step-up and step-down transformers from saturating (e.g., during normal operation thereof).

The present invention therefore introduces the broad concept of providing step-up and step-down transformers within a modular power supply to reduce inter-module switching currents and employs a diode to counteract any imbalance or saturation that may occur due to inter-module transfer conductor resistance and leakage inductance. For purposes of the present invention, "diode" is broadly defined to include any switching device including an active switch such as a field-effect transistor. It should be clear that the diode may be located in the input module, the output module or on the transfer conductor.

In one embodiment of the present invention, the input power is AC input power, the input module further employing an electromagnetic interference filter, a power factor correction circuit and a main power switch controller to provide the intermediate power. In an alternative embodiment of the present invention, the input power is DC input power, the input module further employing an electromagnetic interference filter and a main power switch controller to provide the intermediate power. Thus, the present invention provides a modular power supply that is adaptable to convert from either AC or DC input power without modifying the output module.

In one embodiment of the present invention, the step-down transformer further serves as an isolation transformer for the output module. In an embodiment to be illustrated and described, the step-down transformer and output module isolation transformer are integrated into a single magnetic device having a common core.

In one embodiment of the present invention, the output module further employs an output filter to provide filtered DC output power. Those skilled in the art are familiar with the structure and function of output filters. The present invention, however, does not require an output filter.

In one embodiment of the present invention, the step-up transformer employed by the input module has a turns ratio substantially equaling the reciprocal turns ratio of the step-down transformer employed by the output module. Of course, all other turns ratios are within the broad scope of the present invention.

In one embodiment of the present invention, the main power switch is a field-effect transistor (FET). Other switches (solid state and otherwise) are within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
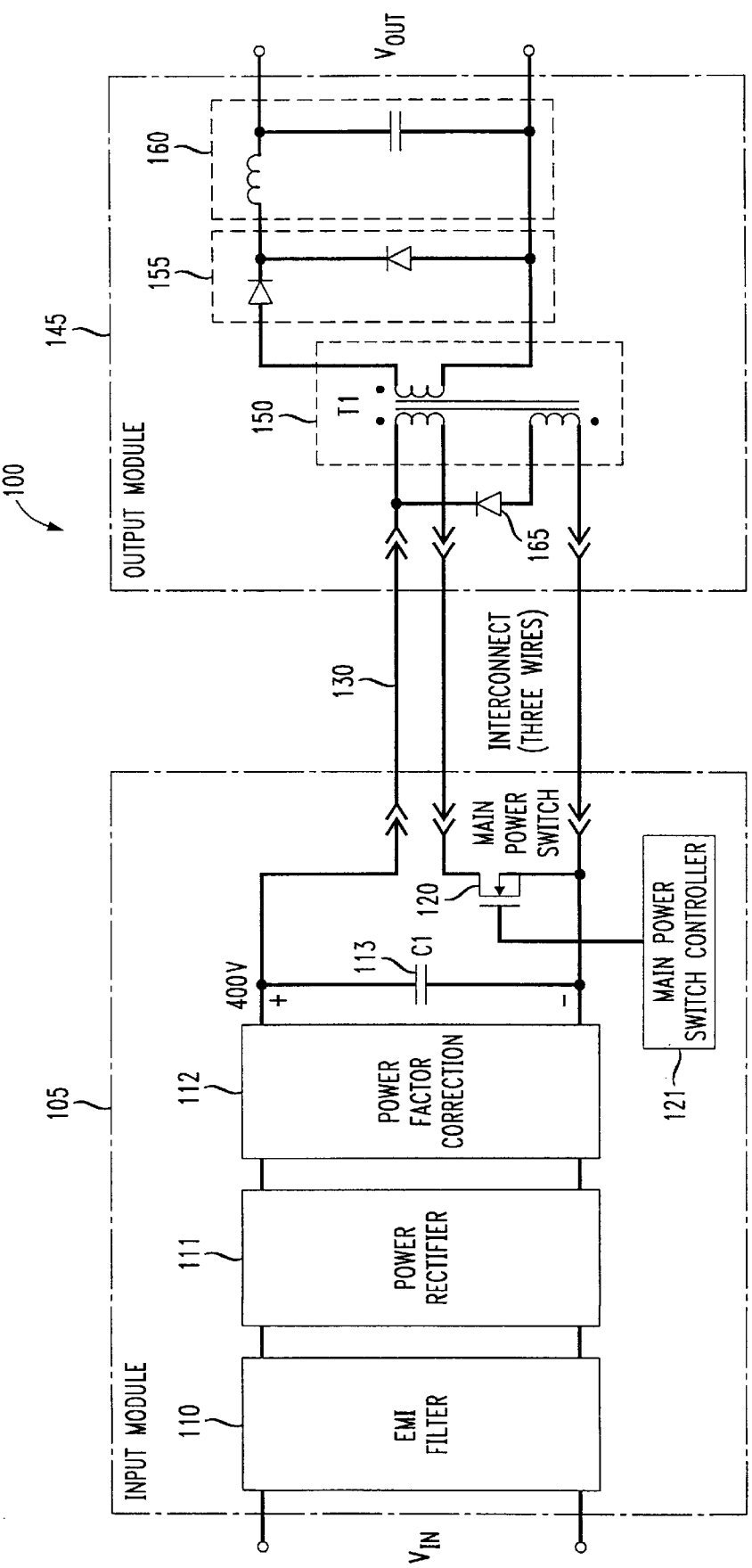
FIG. 1 illustrates a schematic diagram of a prior art modular power supply.

Referring initially to FIG. 1, illustrated is a schematic diagram of a prior art modular power supply 100. The modular power supply 100 includes an input module 105 having an electromagnetic interference (EMI) filter 110, a power rectifier 111, a power factor correction circuit 112, a filter capacitor 113, a main power switch 120 and a main power switch controller 121. The modular power supply further includes an interconnect 130 and an output module 145 having a transformer 150, a rectifier 155, an output filter 160 and a reset diode 165. The transformer 150 includes a primary power winding connected to the interconnect 130, a secondary power winding connected to the rectifier 155 and a reset winding connected between the interconnect 130 and the reset diode 165.

The modular power supply 100 employs the input module 105 containing the EMI filter 110 to suppress electromagnetic interference and the power rectifier 111 to convert the AC input voltage into a DC voltage. The power factor correction circuit 112 aligns the voltages and currents to maximize power transfer. The filter capacitor 113 provides smoothing of the DC voltage. The main power switch 120 works in conjunction with the main power switch controller 121 to provide power over the interconnect 130 to the output module 145. The transformer 150 isolates the output voltage Vout that is produced via the rectifier 155 and the output filter 160. The reset winding of the transformer 150 is preferable for the single transistor forward embodiment shown, which employs a single main power switch, and works in conjunction with the reset diode 165 to reset the transformer 150. Resetting the transformer 150 is preferable to prevent it from becoming saturated and therefore inoperable. The DC voltage out of the input module 105 is shown to be 400 volts. This intermediate DC voltage of 400 volts provides an interconnect current that can be handled by a wiring harness of standard design.

In some situations, however, the input voltage must be reduced to a range of about 40 volts. This action results in a corresponding current increase in the same order of magnitude to maintain the power transfer at the same value provided by the larger voltage. This ten-fold current increase, for instance, precludes the use of the existing wiring harness to accommodate the switching currents between the input module 105 and the output module 145. At these elevated interconnect current levels, even copper bus bars may not provide a resistance low enough to allow the proper operation of the modular power supply 100, given the physical packaging constraints and the switching frequencies involved.

Figure 2:
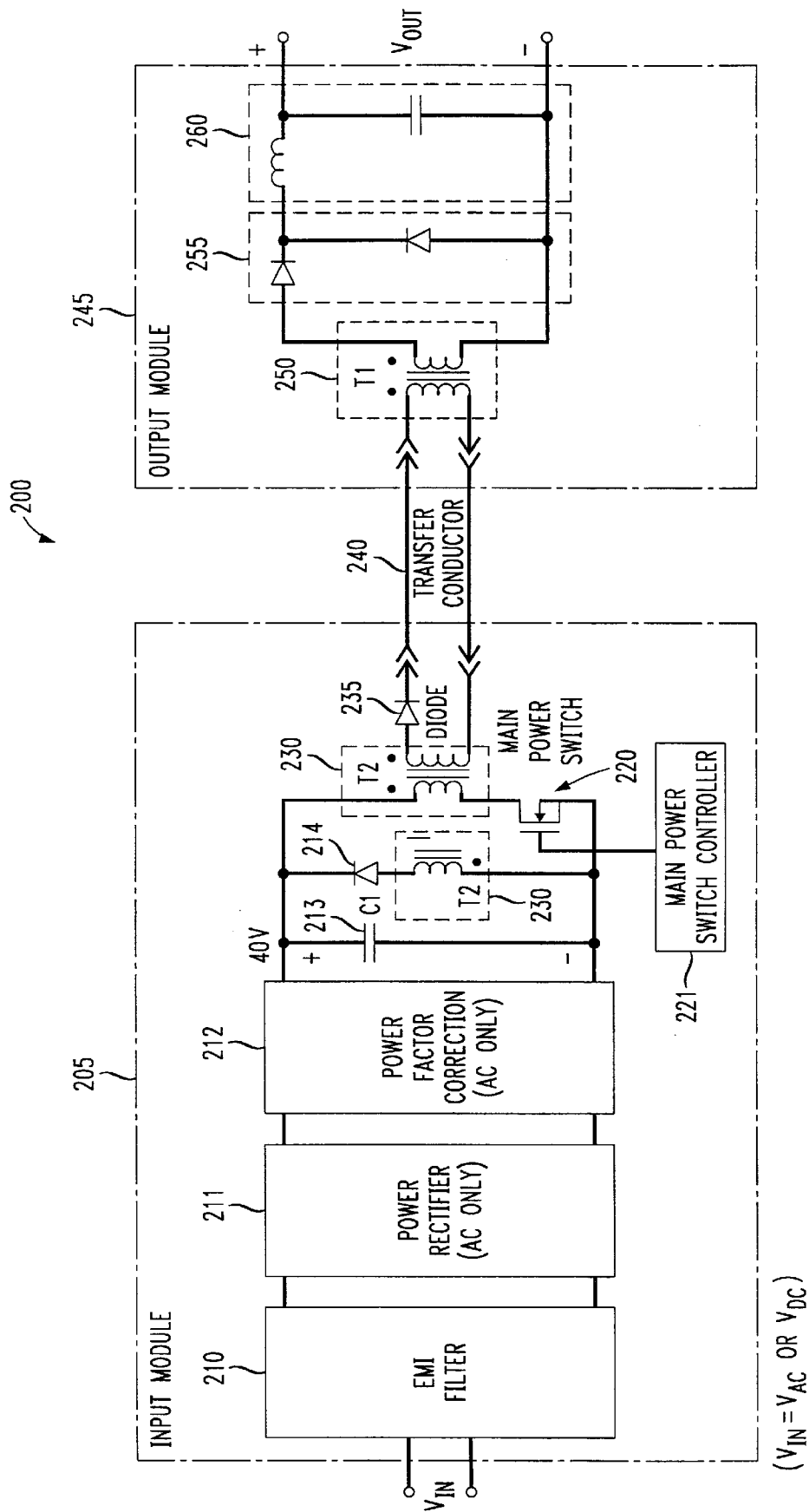
FIG. 2, illustrates a schematic diagram of a modular power supply constructed according to the principles of the present invention.

Turning now to FIG. 2, illustrated is a schematic diagram of a modular power supply 200 constructed according to the principles of the present invention. The modular power supply 200 includes an input module 205 having an EMI filter 210, a power rectifier 211, a power factor correction circuit 212, a filter capacitor 213, a reset diode 214, a main power switch 220, a main power switch controller 221, a step-up transformer 230 and a diode 235. The modular power supply 200 further includes a transfer conductor 240 and an output module 245 having a step-down transformer 250, a rectifier 255 and an output filter 260.

The input module 205 accepts input power and employs the main power switch 220 and the step-up transformer 230 to provide intermediate power at an enhanced voltage. The step-up transformer 230 includes a primary power winding, a secondary power winding connected to the diode 235 and a reset winding, which works in concert with the reset diode 214, to reset the step-up transformer 230 due to the use of the single main power switch in this single transistor forward topology embodiment. The step-up transformer 230 provides an increased voltage and therefore a decreased current to the transfer conductor 240. The main power switch 220 is shown to be a field-effect transistor (FET). However, other switches (solid state and otherwise) are within the broad scope of the present invention.

The input voltage Vin applied to the modular power supply 200 is an AC input power. The input module 205 employs the EMI filter 210 to reduce or suppress electromagnetic interference that may be associated with the use of an AC power input. The power rectifier 211 converts the AC input voltage into a DC voltage, and the power factor correction circuit 212, which may employ a boost supply circuit, aligns the phases of the voltage and current for maximum power transfer. The main power switch controller 221, in concert with the main power switch 220 and the step-up transformer 230, then provide the intermediate power. Additionally, the input power may also be provided by a DC input voltage source without the need for power factor correction or rectification. Thus, the present embodiment of the invention illustrates that the modular power supply 200 is adaptable to convert from either AC or DC input power without modifying the output module 245.

The power transfer conductor 240 is coupled from the output of the input module 205 to the input of the output module 245. The output module 245 accepts the intermediate power and employs the step-down transformer 250 along with the rectifier 255 to provide DC output power at a voltage that is less than the enhanced voltage. The output module 245 further employs the output filter 260 to provide a filtered DC output voltage Vout and to deliver the corresponding output power. Those skilled in the art are familiar with the structure and function of output filters. The diode 235, located on the input module 205 in this embodiment, couples the input and output modules 205, 245 to prevent the step-up and step-down transformers 230, 250 from saturating. It should be clear that, in general, the diode 235 may be located on the input module 205, the output module 245 or be part of the transfer conductor 240.

The present invention therefore introduces the broad concept of providing step-up and step-down transformers 230, 250 within the modular power supply 200 to reduce inter-module switching currents. The reduction in switching current causes a reduction in electromagnetic emissions, parasitic losses and allows for a simpler interconnection scheme. In the present embodiment, the step-up transformer 230 employed by the input module 205 has a turns ratio substantially equaling the reciprocal of the turns ratio of the step-down transformer 250 employed by the output module 245. Of course, all other turns ratios are within the broad scope of the present invention. Additionally, the step-down transformer 250 further serves as an isolation transformer for the output module 245 allowing the output voltage Vout to be isolated from the input module 205, if desired.

The present invention also introduces the concept of employing the diode 235 to counteract any long-term imbalance or saturation effects that may otherwise occur in the step-up or step-down transformers 230, 250 due to inter-module transfer conductor resistance (IMTCR). The IMTCR becomes significant for larger transfer currents which cause a voltage drop across the IMTCR thereby reducing the volt-microseconds applied to the step-down transformer 250. The main power switch controller 221 senses this short fall in the output voltage Vout and adjusts the duty cycle for the main power switch 220 to compensate therefor.

During a reset or "OFF" portion of the switching cycle, however, the IMTCR carries only magnetizing and leakage currents, which are typically an order of magnitude smaller than the reflected load current that flows during an "ON" time. During this OFF time, the effects of the IMTCR become almost insignificant, and the full input voltage is reflected through the step-up transformer 230 into the primary of the step-down transformer 250. This forces the core of the step-down transformer 250 to reset faster than the core of the step-up transformer 230. When this reset occurs, the current between the two transformers would reverse and continue to increase until the step-up transformer 230 was reset, if the diode 235 were not present.

This action, over subsequent cycles, would cause one or possibly both of the cores of the step-up and step-down transformers 230, 250 to eventually saturate. To prevent this damaging phenomenon from occurring, the diode 235 is inserted in series between the output of the step-up transformer 230 and the input of the step-down transformer 250. This placement prevents the reverse current discussed above from flowing between the two transformers after the step-down transformer 250 resets, thereby allowing each transformer to reset naturally before the next ON time or conduction cycle begins to deliver the load current required. Those skilled in the art will realize that the diode 235 is used as an example of the general class of switching devices which may be employed to perform the aforementioned functionality.

While specific embodiments of a modular power supply (analogous to a forward converter topology) have been illustrated and described, other power supplies (including topologies employing multiple main power switches) are well within the broad scope of the present invention. For a better understanding of power supplies, in general, see "Principles of Power Electronics" by John G. Kassakian, et al., Addison Wesley, Inc. (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. A modular power supply, comprising:

an input module that accepts input power and employs a main power switch and a step-up transformer to provide intermediate power at an enhanced voltage at an output thereof;

a power transfer conductor coupled to said output;

an output module, having an input coupled to said conductor, that accepts said intermediate power and employs a step-down transformer and an output rectifier to provide DC output power at a voltage that is less than said enhanced voltage, and a diode, coupled to said input and output modules, that prevents said step-up and step-down transformers from saturating.

2. The modular power supply as recited in claim 1 wherein said input power is AC input power, said input module further employing an electromagnetic interference filter, a power factor correction circuit and a main power switch controller to provide said intermediate power.

3. The modular power supply as recited in claim 1 wherein said input power is DC input power, said input module further employing an electromagnetic interference filter and a main power switch controller to provide said intermediate power.

4. The modular power supply as recited in claim 1 wherein said step-down transformer further serves as an isolation transformer for said output module.

5. The modular power supply as recited in claim 1 wherein said output module further employs an output filter to provide said DC output power.

6. The modular power supply as recited in claim 1 wherein said step-up transformer has a turns ratio substantially equaling a reciprocal turns ratio of said step-down transformer.

7. The modular power supply as recited in claim 1 wherein said main power switch is a field-effect transistor (FET).

8. The modular power supply as recited in claim 1 wherein said input module further comprises an input filter capacitor.

9. The modular power supply as recited in claim 1 wherein said input module further comprises an input rectifier.

10. The modular power supply as recited in claim 1 wherein said output rectifier comprises at least one rectifier diode.

11. A method of producing DC output power, comprising:

employing a main power switch and a step-up transformer of an input module to convert input power into intermediate power at an enhanced voltage at an output thereof;

transferring said intermediate power from said input module with a power transfer conductor coupled to said output and having a diode in electrical communication therewith;

employing a step-down transformer and an output rectifier of an output module to convert said intermediate power into DC output power at a voltage that is less than said enhanced voltage; and preventing said step-up and step-down transformers for saturating with said diode.

12. The method as recited in claim 11 wherein said input power is AC input power and said input module further comprises an electromagnetic interference filter, a power factor correction circuit and a main power switch controller.

13. The method as recited in claim 11 wherein said input power is DC input power and said input module further comprises an electromagnetic interference filter and a main power switch controller.

14. The method as recited in claim 11 wherein said step-down transformer further serves as an isolation transformer for said output module.

15. The method as recited in claim 11 further comprising filtering said DC output power.

16. The method as recited in claim 11 wherein said step-up transformer has a turns ratio substantially equaling a reciprocal turns ratio of said step-down transformer.

17. The method as recited in claim 11 wherein said main power switch is a field-effect transistor (FET).

18. The method as recited in claim 11 further comprising filtering said intermediate power.

19. The method as recited in claim 11 further comprising rectifying said input power.

20. The method as recited in claim 11 wherein said output rectifier comprises at least one rectifier diode.

* * * * *